United States Patent
de Bruin et al.

(10) Patent No.: US 8,107,425 B2
(45) Date of Patent: Jan. 31, 2012

(54) RADIO QUALITY BASED CHANNEL RESOURCE MANAGEMENT

(75) Inventors: Peter de Bruin, Gammelstad (SE); Ylva Timner, Luleå (SE); Tomas Jönsson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 613 days.

(21) Appl. No.: 11/662,386

(22) PCT Filed: Oct. 25, 2004

(86) PCT No.: PCT/SE2004/001550
§ 371 (c)(1),
(2), (4) Date: Mar. 13, 2009

(87) PCT Pub. No.: WO2006/046889
PCT Pub. Date: May 4, 2006

(65) Prior Publication Data
US 2010/0034185 A1    Feb. 11, 2010

(51) Int. Cl.
*H04Q 7/00* (2006.01)
(52) U.S. Cl. .................................... 370/329; 370/252
(58) Field of Classification Search .............. 370/252, 370/328, 329, 330, 335, 336, 337, 338, 342, 370/343, 344, 345
See application file for complete search history.

(56) References Cited

U.S. PATENT DOCUMENTS

| | | | |
|---|---|---|---|
| 5,594,720 A | 1/1997 | Papadopoulos et al. | |
| 6,236,672 B1 * | 5/2001 | Hiramatsu | 375/141 |
| 6,590,885 B1 | 7/2003 | Jorgensen | |
| 6,636,500 B2 * | 10/2003 | Krishnamoorthy et al. | 370/347 |
| 6,665,289 B1 * | 12/2003 | Sebire et al. | 370/347 |
| 6,879,834 B2 * | 4/2005 | Virtanen | 455/452.2 |
| 6,952,413 B2 * | 10/2005 | Beard et al. | 370/348 |
| 6,967,943 B1 * | 11/2005 | Hamalainen et al. | 370/347 |
| 7,006,554 B2 * | 2/2006 | Sun et al. | 375/130 |
| 7,050,824 B2 * | 5/2006 | Masseroni et al. | 455/522 |
| 7,170,877 B2 * | 1/2007 | Livet et al. | 370/337 |
| 7,636,337 B2 * | 12/2009 | Parantainen et al. | 370/336 |

(Continued)

FOREIGN PATENT DOCUMENTS

| | | |
|---|---|---|
| EP | 1229671 A2 | 8/2002 |
| WO | 2004/057900 A1 | 7/2004 |

OTHER PUBLICATIONS

International Search Report in PCT/SE2004/001550 mailed May 31, 2005.

(Continued)

*Primary Examiner* — Ricky Ngo
*Assistant Examiner* — Christine Ng
(74) *Attorney, Agent, or Firm* — Nixon & Vanderhye, P.C.

(57) ABSTRACT

The present invention provides a quality based resource management in a radio communications system. In this resource management, channel resources are dynamically allocated to a multiresource capable mobile unit based on a radio quality of a radio link between the mobile unit and an associated base station. Thus, the amount of these resources to be allocated to the mobile unit is determined based on this radio quality and can be dynamically updated based on new quality reports. A high experienced quality means that more resources are allocated. The quality based resource allocation can also be combined with a quality based transmission scheduling. In such a case, mobile units experiencing a high quality are allowed to transmit more often in a period of time than mobile units with low quality.

20 Claims, 8 Drawing Sheets

U.S. PATENT DOCUMENTS

2003/0027578 A1    2/2003    Zeira et al.
2003/0081569 A1*   5/2003    Sexton et al. ............... 370/329
2004/0082356 A1    4/2004    Walton et al.
2005/0094605 A1*   5/2005    Sun et al. .................... 370/337
2006/0072508 A1*   4/2006    Zou et al. .................... 370/332

OTHER PUBLICATIONS

EP Office Action mailed Feb. 22, 2010 in EP application 04793851.9.
EP Office Action mailed Feb. 17, 2009 in corresponding EP application 04793851.9-2411.

* cited by examiner

RADIO QUALITY BASED CHANNEL RESOURCE MANAGEMENT

This application is a U.S. national phase of International Application No. PCT/SE2004/001550 filed 25 Oct. 2004, which designated the U.S., the entire contents of which are hereby incorporated by reference.

TECHNICAL FIELD

The present invention generally relates to radio communications systems, and in particular to radio quality based resource management in such systems.

BACKGROUND

A general goal in the radio communications systems of today is to increase the system throughput and user bit-rates. For example, different so-called link adaptation techniques have been presented and are currently employed to form a part of this user bit-rate increase.

Another potential user bit-rate increasing solution is the introduction of so-called multi-resource capable mobile units in existing radio communications systems. For example, mobile units having the capability of utilizing multiple, i.e. at least two, timeslots are now available for Global Systems for Mobile communication (GSM) and General Packet Radio Service (GPRS) systems employing the Enhanced Data for Global Evolution (EDGE) extension. The basic idea behind this introduction of multi-slot mobile units has been that the bit-rate for an X-slot mobile unit will (theoretically) be X times the rate of a single-slot mobile unit. According to this presumption, bit-rates up to 8×59=472 kbps should theoretically be possible for an 8-slot capable mobile unit in an Enhanced GPRS (EGPRS) system.

The typical and most usual allocation scheme for allocating these multiple timeslots to a multi-slot mobile unit according to the prior art is to allocate X timeslots to an X-slot capable mobile unit. In other words, the number of timeslots (resources) allocated to a mobile unit is equal to the timeslot capability number of the mobile unit. However, in certain situations, the cell in which the mobile unit is present (or alternatively expressed as the base station to which the mobile unit is connected) has only a limited number $Y_1$ of timeslots available. As a consequence, then the X-slot mobile unit is only allocated $Y_1$ timeslots ($Y_1 \leq X$). In addition, the timeslot allocation could be defined by the communications service the mobile unit is to use. In these cases, an X-slot capable mobile unit will be allocated $Y_2$ timeslots, where the number $Y_2$ is defined by the communications service and $Y_2 \leq X$.

In all of these possible prior art allocation solutions, the number of timeslots to be allocated to a mobile unit is determined (based on mobile unit capability, channel availability or communications service) during the communications session/service setup procedure and always amounts to the maximum number of timeslots, given availability. This prior art allocation works fairly well at low load and good radio quality conditions. However, at high loads and/or low radio quality the user bit-rates per timeslot for the multi-slot capable mobile units decrease and may even be worse than the corresponding bit-rates in a system with only single-slot mobile units.

SUMMARY

The technology disclosed herein overcomes these and other drawbacks of the prior art arrangements.

It is a general object of the technology disclosed herein to provide radio quality based resource management in radio communications systems.

It is a further object of the technology disclosed herein to provide a dynamic quality based resource management in radio communications systems.

It is a particular object of the technology disclosed herein to provide a radio quality based channel resource allocation in radio communications systems.

It is another particular object of the technology disclosed herein to provide a combined radio quality based resource allocation and scheduling in radio communications systems.

Briefly, the technology disclosed herein involves a dynamic radio quality based channel resource management in radio communications systems. In a first aspect of the technology disclosed herein, a dynamic radio quality based resource allocation for multi-resource capable mobile units is provided in such communications systems. Such mobile units have the capability to (simultaneously) utilize multiple, i.e. at least two, channel resources and can, thus, be allocated at least two resources to use on a radio link between the mobile unit and a base station for a communications session. The maximum number of resources that can be allocated to such a multi-resource mobile unit, i.e. the multiple resource capability number of the mobile unit, is typically defined by the hardware and/or software equipment of the mobile unit.

In this first aspect of the technology disclosed herein, a radio quality representation for the radio link between the mobile unit and the base station is determined. This quality representation is preferably obtained through quality-related signal measurements and/or estimations performed by the mobile unit and/or the base station. Any such quality measure or estimation representative or indicative of the radio quality experienced by the mobile unit can be used according to the technology disclosed herein.

The so-obtained quality representation is then forwarded to a resource allocator provided in the radio communications system. This allocator determines the amount of channel resources to allocate to the mobile unit based on the received quality representation. Generally speaking, the better radio quality experienced by the mobile unit, as determined based on the quality representation, the more (up to the predefined capability number of the mobile unit) channel resources are allocated to this mobile unit. As a consequence, mobile units currently having a poor quality on their radio links are allocated fewer resources or possibly even no resources at all.

In addition, the resource allocation is preferably dynamically updated e.g. during the communications session based on new radio quality reports. In other words, if the radio quality experienced by a multi-resource mobile unit changes, the amount of channel resources allocated to the mobile unit preferably is adjusted accordingly. This means that a mobile unit with a poor quality, which initially was allocated only a very few channel resources will be allocated more such resources once its associated radio quality subsequently improves. Thus, although the reduced resource allocation to mobile units with poor quality according to the dynamic resource allocation of the technology disclosed herein could be viewed as disadvantageous for the mobile unit over a short period of time, the system throughput and also user bit-rate of the mobile unit actually improves over time.

In a preferred embodiment of the technology disclosed herein the amount of resources allocated to a multi-resource capable mobile unit and in particular such a mobile unit with a maximum capability number exceeding two is less than the predefined maximum capability number of channel resources, in particular in low quality situations.

In a further preferred implementation of the technology disclosed herein, the channel resources are timeslots on a given carrier frequency or timeslots on multiple carrier frequencies. Furthermore, allocation of multiple spreading codes to a mobile unit is another example of suitable channel resources according to the technology disclosed herein.

In another aspect of the technology disclosed herein, a dynamic combined quality based resource allocation and transmission scheduling is provided. Thus, the mobile units that are to be allowed to transmit on the allocated channel resources and how often they are allowed to transmit could also be determined based on the radio quality representations of the mobile units. This means that a multi-resource capable mobile unit experiencing a high radio quality is generally allowed to transmit before and/or more often in a given period of time than a mobile unit experiencing a poor quality. In order to prevent shutting out mobile units with poor radio quality from data transmission and reception and, thus, preventing these mobile units measuring and reporting determined radio quality representations, each mobile unit could be guaranteed a minimum amount of data transmissions. Thus, if a mobile unit is associated with a radio quality worse than represented by a minimum quality threshold it is scheduled these minimum amount of transmissions. Remaining mobile units are then scheduled based, at least partly, on their respective reported radio qualities.

Also this scheduling for a mobile unit is preferably dynamically adjusted based on new radio quality reports from the mobile unit and/or its associated base station.

The technology disclosed herein offers the following advantages:
- Enables continuous efficient utilization of channel resources in communications system;
- Optimizes system performance in terms of system throughput and capacity;
- Enables controlled system behavior at high loads; and
- Provides full flexibility of channel resources in both the bandwidth and time domain by allowing flexible and efficient utilization of channel resources.

Other advantages offered by the technology disclosed herein will be appreciated upon reading of the below description of the embodiments of the technology disclosed herein.

SHORT DESCRIPTION OF THE DRAWINGS

The technology disclosed herein together with further objects and advantages thereof, may best be understood by making reference to the following description taken together with the accompanying drawings, in which.

DETAILED DESCRIPTION

Throughout the drawings, the same reference characters will be used for corresponding or similar elements.

The technology disclosed herein relates to channel resource management in radio communications systems and in particular to radio quality based resource allocation and combined radio quality based resource allocation and transmission scheduling.

The general idea of this inventive resource allocation is to dynamically allocate channel resources to a multi-resource capable mobile based on a radio or link quality associated with a communication link between the mobile unit and a base station. In addition, more such channel resources are allocated to a multi-resource mobile unit currently experiencing a high or good radio quality than to a multi-resource mobile unit having a comparatively lower or worse radio quality.

In a particular embodiment of the technology disclosed herein, this radio quality based dynamic resource allocation is combined with a radio quality based (dynamic) transmission scheduling. In such a scheduling, a multi-resource capable mobile unit experiencing a high radio quality is allowed to transmit, by means of the previously allocated channel resources, before and/or more often during a given period of time than a multi-resource mobile unit with a comparatively lower associated radio quality. In addition, since the radio quality of the radio link of a mobile unit is typically changing over time, the number of allocated channel resources and preferably also the scheduling are dynamically updated even during an ongoing communications session or service.

Figure 1:
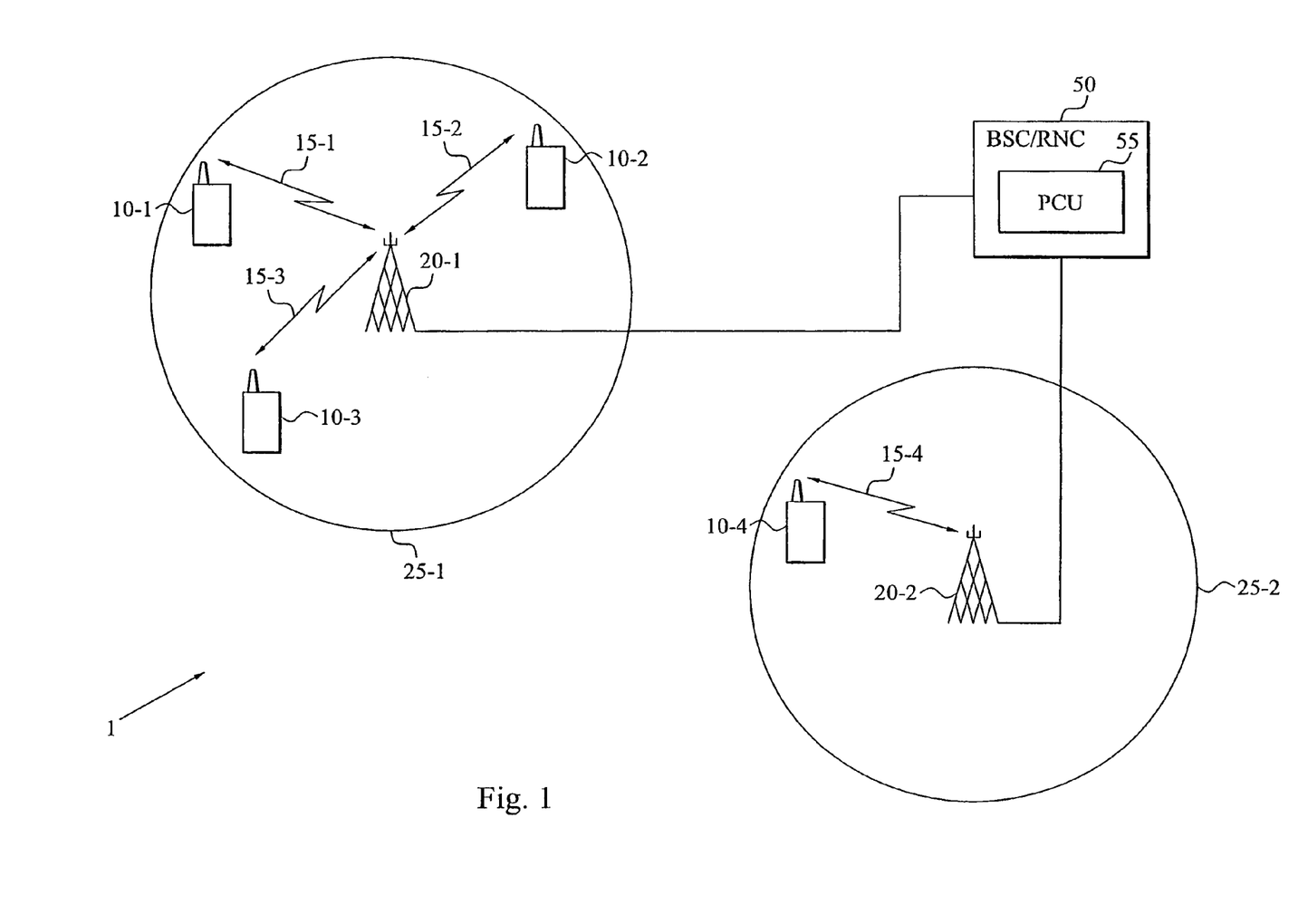
FIG. 1 is a schematic overview of a portion of a radio communications system, to which the teachings of the technology disclosed herein can be applied.

FIG. 1 is a schematic overview of a portion of a radio communications system 1, to which the teachings of the technology disclosed herein can be applied. This radio communications system could be a GSM system, GPRS system, GPRS system employing the EDGE technique, i.e. an EGPRS system, a Universal Mobile Telecommunications System (UMTS), or any other radio communications system utilizing whatsoever multiple access method, e.g. a Time Division Multiple Access (TDMA) system, a Frequency Division Multiple Access (FDMA) system, different Code Division Multiple Access (CDMA) systems, e.g. Direct Sequence CDMA (DS-CDMA) or Wideband CDMA (WCDMA), a Orthogonal Frequency Division Multiple Access (OFDMA) system, or a system employing a combination of the above-identified multiple access methods.

The communications system 1 generally includes a number of base stations or base transceiver stations 20-1, 20-2 providing communications services to mobile units 10-1 to 10-4 present within their respective radio coverage area or cell/sector 25-1, 25-2. As is well known in the art, the mobile unit 10-1 to 10-4 present in a cell 25-1, 25-2 can conduct radio communication on a communications or radio link or channel 15-1 to 15-4 with the relevant base station(s) 20-1, 20-2.

A dynamic resource allocator (not illustrated) according to the technology disclosed herein is provided in the radio communication system 1 for dynamically allocating channel resources to the mobile units 10-1 to 10-4 for usage on the respective radio links 15-1 to 15-4. This resource allocator could be implemented in a base station controller (BSC) or radio network controller (RNC) 50 connected to and controlling operation of the base stations 20-1, 20-2. Alternatively, the allocator could be arranged in a dedicated data packet control unit (PCU) 55 in the BSC or RNC 50. It is also anticipated by the technology disclosed herein that such a resource allocator can be implemented in a base station subsystem (BSS) or actually in one or several base stations 20-1, 20-2.

Thus, this resource allocator then receives radio or link quality related data, such as radio quality measurements or estimations, from the relevant mobile unit 10-1 to 10-4 and/or from the base station 20-1, 20-2 communicating with the mobile unit 10-1 to 10-4. Any measure or estimation representative or indicative of the radio quality for the radio link 15-1 to 15-4 of the mobile unit 10-1 to 10-4 known in the art can be used according to the technology disclosed herein. Thus, both radio quality representations obtained directly from actual measurements performed by the mobile unit 10-1 to 10-4 and/or base station 20-1, 20-2 and quality representations estimated from other types of data or measurements can be used as radio qualities according to the technology disclosed herein. Non-limiting examples of such suitable radio quality representations include bit error rate (BER), bit error probability (BEP), block error rate (BLER), block error probability (BLEP), carrier-to-interference ratio (C/I), carrier-to-noise ratio (C/N), signal-to-interference ratio (S/I), signal-to-noise ratio (S/N), radio link throughput and (user) bit-rate.

Based on these radio quality estimation(s) and/or measurement(s) originating from the mobile unit 10-1 to 10-4 and/or base station 20-1, 20-2, the allocator determines the amount of channel resources to presently allocate to the mobile unit 10-1 to 10-4. Thus, if the mobile unit 10-1 to 10-4 is an X-resource capable mobile unit, i.e. a mobile unit having a (predefined) capability of potentially employing X channel resources, the allocator allocates or allots, based on the radio link quality, Y channel resources to the mobile unit 10-1 to 10-4 to use on the radio link 15-1 to 15-4, where $Y \leq X$, X is an integer larger than one and Y is an integer, preferably an integer larger than one. Thus, in a preferred embodiment of the technology disclosed herein multiple channel resources are allocated to a multi-resource capable mobile unit based on radio quality.

Since the mobile unit 10-1 to 10-4 and/or base station 20-1, 20-2 typically performs several radio quality measurements and estimations over time (during an ongoing communications session), at least some of these measurements/estimations are forwarded to the allocator. As a consequence, the allocator can dynamically allocate or dynamically adjust the allocation for the mobile unit 10-1 to 10-4 during the session based on these new measurements/estimations.

This means that when the X-resource capable mobile unit 10-1 to 10-4 experiences a high radio quality for its associated radio link 15-1 to 15-4, the allocator could allocate $Y_1$ channel resources. However, if the radio quality on the radio link 15-1 to 15-4 subsequently decreases, the allocation can be changed so the mobile unit 10-1 to 10-4 is currently allocated $Y_2$ resources, where $Y_2 \leq Y_1 \leq X$, preferably $1 \leq Y_2 < Y_1 \leq X$ and in some applications more preferably $1 \leq Y_2 < Y_1 < X$.

The technology disclosed herein is in particular applicable when allocating less than the predefined multiple resource capability number of channel resources to the multi-resource mobile unit 10-1 to 10-4 based on the radio quality experienced by the mobile unit 10-1 to 10-4. This multiple resource capability number is larger than one, i.e. the mobile unit 10-1 to 10-4 is a multi-resource mobile unit. As is well known in the art, the capability number of a mobile unit 10-1 to 10-4 is typically defined by the hardware and software equipment of the mobile unit 10-1 to 10-4.

Figure 2:
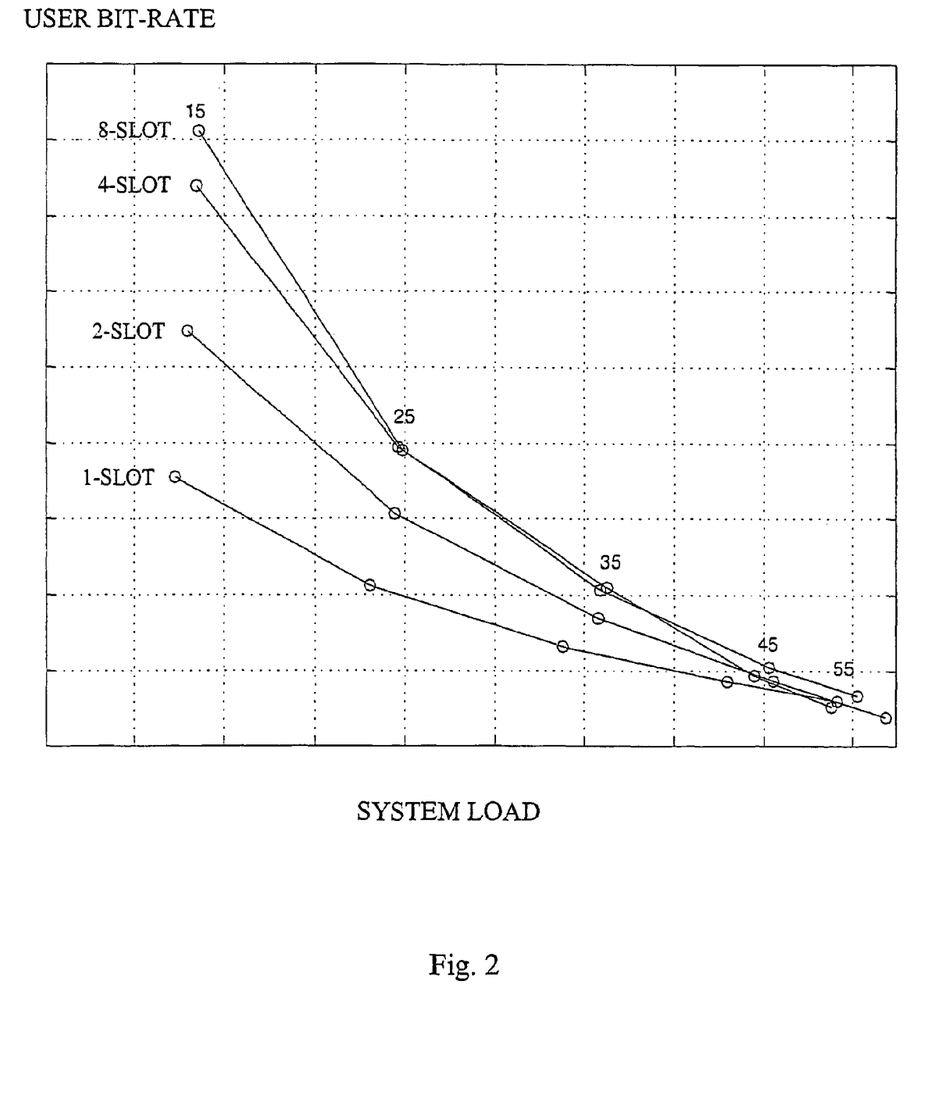
FIG. 2 is a diagram exemplifying the relation between the $10^{th}$ percentile user bit-rate and load for systems with mobile units of different timeslot capacity.

In order to elucidate the advantageous effect of the quality based dynamic resource allocation of the technology disclosed herein and the problems of prior art with fixed channel resource allocation for multi-resource mobile unit, reference is made to FIG. 2.

This FIG. 2 exemplifies the relation between the 10$^{th}$ percentile (circuit switched equivalent, CSE) user bit-rate and the (system) load. In this simulation, the used channel resources are, thus, timeslots. As was discussed in the background section, the general idea of introducing multi-resource, in this case multi-slot, capability for mobile units in a communications system was the presumption that an X-slot mobile unit would have X times better user bit-rate than a single-slot mobile unit.

The diagram of FIG. 2 compares the bit-rates for a respective system with 8-slot, 4-slot, 2-slot and single-slot mobile units with a fixed timeslot allocation (i.e. according to prior art) of eight, four, two and one timeslot, respectively, at different load situations (15, 25, 35, 45 and 55 users per cell or sector). At the higher load levels, the interference in the cell increases, which results in a decreased experienced radio quality.

From this example diagram it is firstly evident that the bit-rate at the lowest load situation is not eight times better for the system with 8-slot mobile unit compared to the system with single-slot mobile unit, rather approximately 2.3 times better. As the load increases, the user-bit rates in the systems with multi-slot mobile units decrease faster than for the system with single-slot mobile units (the higher the slot capability number of the mobile unit, the larger bit-rate drop). At the highest load situation used in this comparison, the user bit-rate in the system with 8-slot mobile units is actually worse than the bit-rate in the system with single-slot mobile units.

Figure 3:
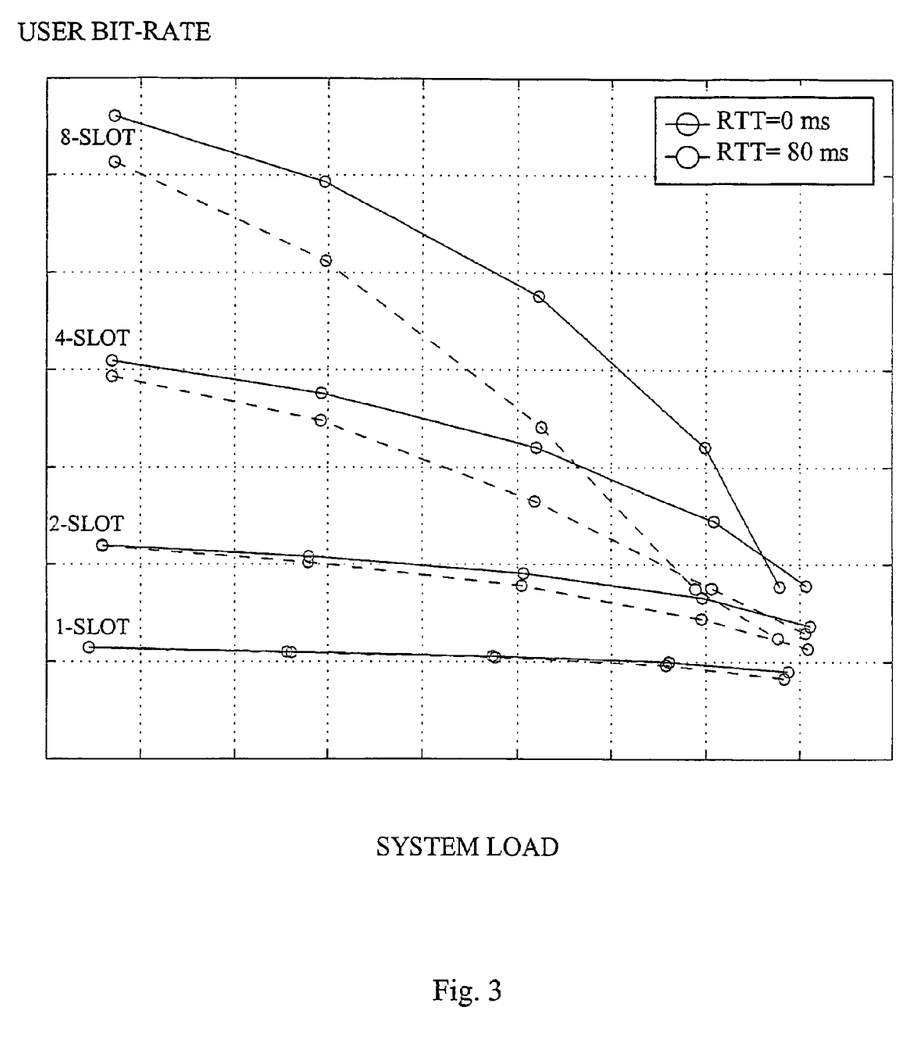
FIG. 3 is a diagram exemplifying the relation between the $90^{th}$ percentile user bit-rate and load for systems with mobile units of different timeslot capacity.

The 10$^{th}$ percentile represents the mobile units with the lowest experienced radio quality in the communications systems. A corresponding diagram of mobile units with higher experienced radio quality is found in FIG. 3. This diagram illustrates the 90$^{th}$ percentile (CSE) user bit-rate versus load at two different round trip times (RTT). At this comparatively higher radio quality (compared to the diagram of FIG. 2), the user bit-rate in a system with 8-slot mobile units is about 5.7 times better than the bit-rate of a single-slot system at the lowest load situation, i.e. a considerable improvement compared to the low radio quality case in FIG. 2. In addition, the decrease in bit-rate at higher loads for systems with multi-slot mobile units relative the system with single-slot mobile unit is not as large as in FIG. 2.

Comparing the systems with single-slot and 8-slot capable mobile units, where the mobile units are always allocated maximum number of timeslots (according to prior art), the mobile units have far smaller possibilities of effecting each other in the single-slot case compared to the 8-slot case. This does not necessarily mean that extra radio interference will be generated in the 8-slot case compared to the single-slot case, but there will be more "scheduling interference" in the 8-slot case. This is due to that all mobile units will be scheduling on all timeslots. In this case, a mobile unit with a poor experienced radio quality will use its allocated resources often due to many transmission failures and retransmissions, which are consequences of the poor quality. Thus, the mobile unit will actually interfere in the sense of competing for resources with all the other mobile units in spite of its low probability of successful transmission. As a consequence, the overall performance of the communications system will be reduced.

The technology disclosed herein provides a solution to this problem by allocating fewer channel resources to multi-resource capable mobile units experiencing a poorer radio quality than multi-resource mobile units with a comparatively better quality. By lowering the resource allocation for a mobile unit with poor quality, it will not take possession of channel resources that it actually cannot use or only use with a limited success or efficiency due to its poor quality. The extra resources, i.e. difference between the resource capability number of the mobile unit and the number of resources actually presently allocated to this mobile unit, can then be better used by the system for mobile units having a larger probability of successful transmission, i.e. experiencing a better radio quality. However, if the radio quality subsequently improves, the mobile unit can be allocated more resources, possibly up to its maximum capability number, and then successfully transmit its data in a short period of time without too many (re)transmissions. Thus, although the reduced resource allocation to mobile units with poor quality according to the dynamic resource allocation of the technology disclosed herein could be viewed as disadvantageous for the mobile unit over a short period of time, the system throughput and also user bit-rate of the mobile unit actually improves over time.

Figure 4:
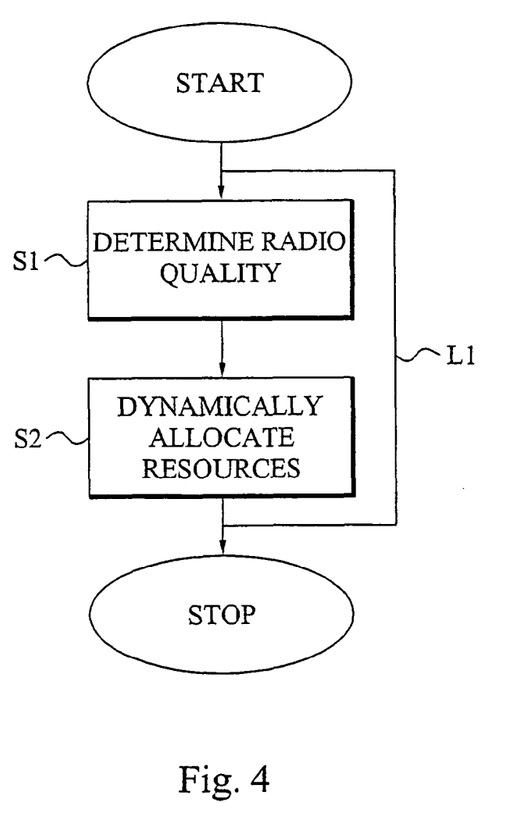
FIG. 4 is a flow diagram illustrating a resource management method according to the technology disclosed herein.

FIG. 4 is a flow diagram illustrating the channel resource management method according to the technology disclosed herein. The method starts in step S1, where a radio or link quality is determined for a radio or communications link between a base station and a multi-resource mobile unit with a predefined multiple resource capability number. This radio quality is determined based on direct measurements and/or estimations performed by the mobile unit and/or base station. A single quality representation could be determined in this step S1. Alternatively, a radio quality integrated or determined over time, e.g. at several different measurement occasions, could be used. In such a case, different weights could be used for the different measurement results to reflect the higher significance of recent measurements compared to old ones. In addition, multiple, i.e. at least two, different radio quality parameters could be determined in this step S1, e.g. selected from the previously mentioned radio quality representations. This (these) determined radio quality (qualities) is (are) forwarded to a resource allocator, unless generated therein. In this latter case, the mobile unit and/or base station can provide raw measurement data to the allocator, which then performs the actual determination or calculation of the radio quality measure(s).

In either case, in a next step S2, the allocator dynamically allocates channel resources to the mobile unit (to be used on the radio link in or during a communications session) based on the radio quality (qualities). In a preferred embodiment, multiple such channel resources are allocated to the mobile unit based on the quality measure(s). In a further preferred embodiment of the technology disclosed herein, less than the predefined capability number of channel resources are allocated to the mobile unit, in particular when the quality measure reflects a medium or poor, i.e. non-optimal, radio quality for the mobile unit. Thus, generally the better-experienced radio quality, as determined based on the radio quality measure, the more channel resources are allocated to the mobile unit (up to the maximum capability number). Correspondingly, the worse radio quality, the fewer resources are allocated to the mobile unit.

This allocation is preferably dynamically updated during the communications session based on new radio quality measurements and/or estimations, which is schematically illustrated by the line L1. For example, the mobile unit and/or base station could be configured for reporting all the quality data it has measured or calculated, i.e. at every quality measurement occasion. Alternatively, only a portion of this quality data is forwarded to the allocator, especially in radio communications system with expected slowly changing radio link conditions.

This radio quality based dynamic multi-resource allocation enables continuous utilization of the multiple channel resource domain making it possible to e.g. initially allocate only a few channel resources at low quality situations and then gradually increase the number (at higher quality situations) while trying to reach a setting that optimizes the system performance.

Figure 5:
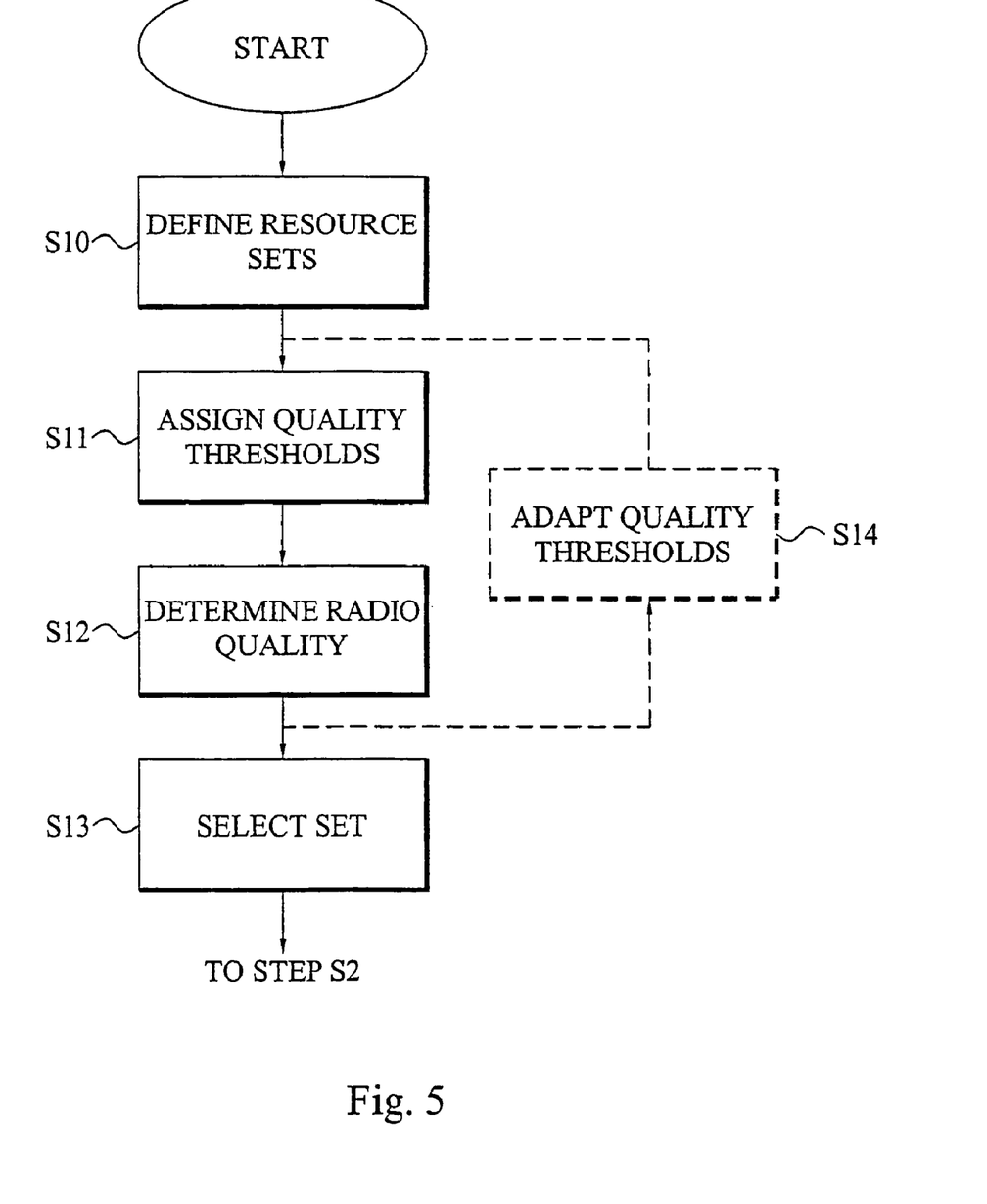
FIG. 5 is a flow diagram illustrating additional steps of the resource management method of FIG. 4.

FIG. 5 is a flow diagram illustrating additional steps of the resource management method of FIG. 4. The method starts in step S10, where the allocator or the network operator or manager defines multiple sets of maximum number of allocable communications resources for a given cell or sector in the communications system. For example, assume that a cell potentially has access to eight (parallel) channel resources to (simultaneously) allocate among its associated or connected mobile unit. A first set could then include (maximum) eight channel resources, a second set comprises seven resources and so on, i.e. set i includes 9-i channel resources in this example, i=1 . . . 9. Actually, any definition of such sets with different associated number of channel resources can be used according to the technology disclosed herein.

In a next step S11, a respective quality threshold is assign or associated to the different respective sets. In other words, a quality threshold $T_i$ is assigned to set i, i=1 . . . N, where N is the number of sets. If a high (low) quality measure represents a good experienced radio quality, then $T_i > T_{i+1}$ ($T_i < T_{i+1}$). The radio quality for the radio link between the multi-resource capable mobile unit and the base station is determined in a next step S12. This step corresponds to step S1 in FIG. 4 and is not further discussed. Thereafter, in step S13, the determined radio quality is compared to the different quality thresholds. A resource set is then selected based on this quality comparison. The method continues to step S2 in FIG. 4, where the number of channel resources associated with the set is allocated to the mobile unit.

This means that if the radio quality of the mobile unit e.g. exceeds the quality threshold $T_1$ (in cases where a high quality value represents a good quality), the number of channel resources of the first set (eight resources in the example above) are allocated to the mobile unit (unless the capability number of the mobile unit is lower than this number (eight), in which cases the maximum capability number of resources are allocated). If, however, the radio quality measure is smaller than the threshold $T_1$ but exceeds the quality threshold $T_2$, the number of channel resources associated with the second set is allocated to the mobile unit, etc.

In an alternative embodiment, this channel resource allocation could be implemented as follows. At a highest or best radio quality, i.e. when the experienced radio quality exceeds (is below) the threshold $T_1$, X channel resources are allocated to an X-capable mobile unit. However, if the experienced radio quality (RQ) is within the interval $T_2 < RQ < T_1$ ($T_2 > RQ > T_1$), X-1 channel resources are allocated to the X-capable mobile unit. Correspondingly, if the associated radio quality is within the interval $T_3<RQ<T_2$ ($T_3>RQ>T_2$), X-2 channel resources are allocated to the X-capable mobile unit and so on.

The values of the quality thresholds assigned to the sets of varying numbers of channel resources could be predefined and fixed. However, it might be advantageous to adapt or adjust these threshold values during operation. For example, the values could be determined based on the load in the cell, i.e. the number of users competing for the channel resources, the general traffic conditions in the cells and the system, etc. This is schematically illustrated by the optional step S14, which determines whether the quality thresholds should be updated and then adjusts the threshold values if required.

Not only the threshold values could be adjusted during operation, but also the set definitions, i.e. the number of channel resources associated with each set. For example, in situations with high mobile unit density in a cell, and in particular a high density of multi-resource capable mobile units, a simple set definition could be a first set with the maximum number of channel resources and a second set with only one or two resources. Thus, multi-capable mobile units experiencing a good quality is allocated an amount of channel resources that equals their respective maximum capability number. Correspondingly, mobile units with poor experienced quality are then only allocated a single or two resources. In other situations a more refined set definition, employing several more sets and more quality thresholds, could be used.

The radio quality resource allocation of the resource management of the technology disclosed herein can advantageously be complemented with a radio quality based transmission scheduling. In such a quality based scheduling a (multi-resource) mobile unit experiencing a good radio quality is generally allowed to transmit before and/or more often in a period of time than a mobile unit with a correspondingly poorer quality. By combining these two aspects of quality based resource management, channel resources can be dynamically allotted both in the "bandwidth domain" (the number of simultaneous timeslots) as well as in the "time domain" (scheduling). This gives a full flexibility of the channel resources, providing flexible and efficient utilization of the resources.

However, if the dynamic scheduling would solely be a pure quality based dynamic scheduling, it could be possible that mobile units with poor quality never, or very rarely, would be allowed to receive and transmit data. As a consequence, their experienced radio coverage would be reduced, in particular when the system is fully loaded. In addition, at such a poor quality, the mobile unit would never or very seldom be allowed to forward measurement reports to be used for updating both its resource allocation and its scheduling. In order to solve this problem, the quality based dynamic scheduling of the technology disclosed herein is preferably guaranteed a minimum number of scheduled transmissions per time unit for each mobile unit.

Figure 6:
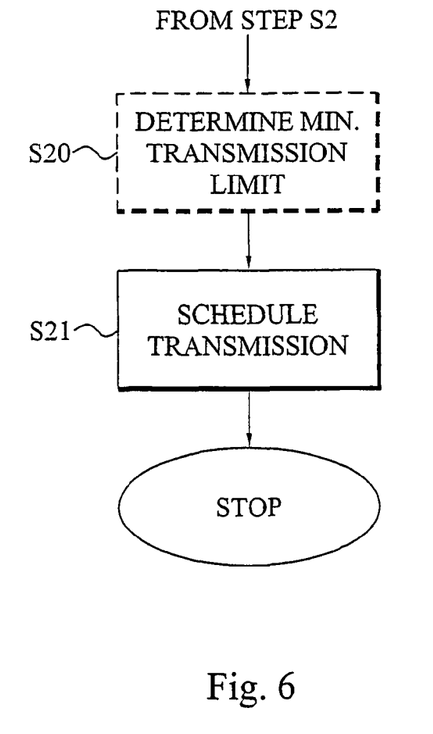
FIG. 6 is another flow diagram illustrating additional steps of the resource management method of FIG. 4.

FIG. 6 is a flow diagram illustrating additional steps of the resource management method of FIG. 4. The method continues from step S2 of FIG. 4, where channel resources were dynamically allocated to multi-resource mobile units based on reported radio qualities. In a next optional step S20, a minimum transmission limit or a minimum number of guaranteed transmissions are determined. This transmission limit could be fixed throughout operation of the communications system. Such a fixed limit could then be that a mobile unit is at least guaranteed to transmit every e.g. $20^{th}$ time it is possible, i.e. every $20^{th}$ radio block or timeslot. Alternatively, the transmission limit could be adjusted or adapted during operation. Then, the limit preferably depends on the number of mobile units per cell or sector and/or the priority of the mobile units. The transmission limit could be updated periodically, intermittently and/or upon provision of new update information.

This transmission limit is then preferably associated with a quality threshold.

In a next step S21, the transmissions for the mobile units within a cell or sector are scheduled on the available channel resources that previously been allocated to the mobile units. This scheduling is further performed based on reported radio quality of the mobile units received therefrom and/or from the relevant base station. In a first embodiment, the scheduling is based solely on the radio quality. However, in certain embodiments it might be advantageous to also use other parameters as basis for the scheduling. For example in a priority scheduling, the scheduling can be based on the respective priority of the different mobile units. This priority is in turn preferably dependent on both the radio quality experienced by the mobile unit and quality of service (QoS) requirements of the relevant communications service of the mobile unit. Certain communications services are more delay sensitive than other services. As a consequence, this difference in QoS for the services can be used in the scheduling together with the radio quality. Typical, non-limiting, QoS parameters that can be used according to the technology disclosed herein include traffic class information, traffic handling priority and allocation/retention priority.

In either case, if a minimum transmission limit is employed these guaranteed transmissions are preferably first distributed among the relevant (all) mobile units. The remaining transmissions are then scheduled based, at least partly, on the radio quality. These remaining transmissions are preferably distributed so that mobile units having a good radio quality is allowed to transmit more often during a given period of time and/or before mobile units with poor quality.

This radio quality based scheduling is preferably updated during operation. Thus, once new radio quality reports are received from the mobile units and/or base stations, the scheduling is adjusted accordingly. As was discussed above for the updating or adjustment of the resource allocation, the scheduling could be based on all such received quality reports or only a portion thereof. However, it might be inconvenient for the system to change the transmission scheduling at each such report occasion. As a consequence, some form of hysteresis mechanism could be employed to prevent not only the scheduling but also the resource allocation from being updated too often.

Figure 7:
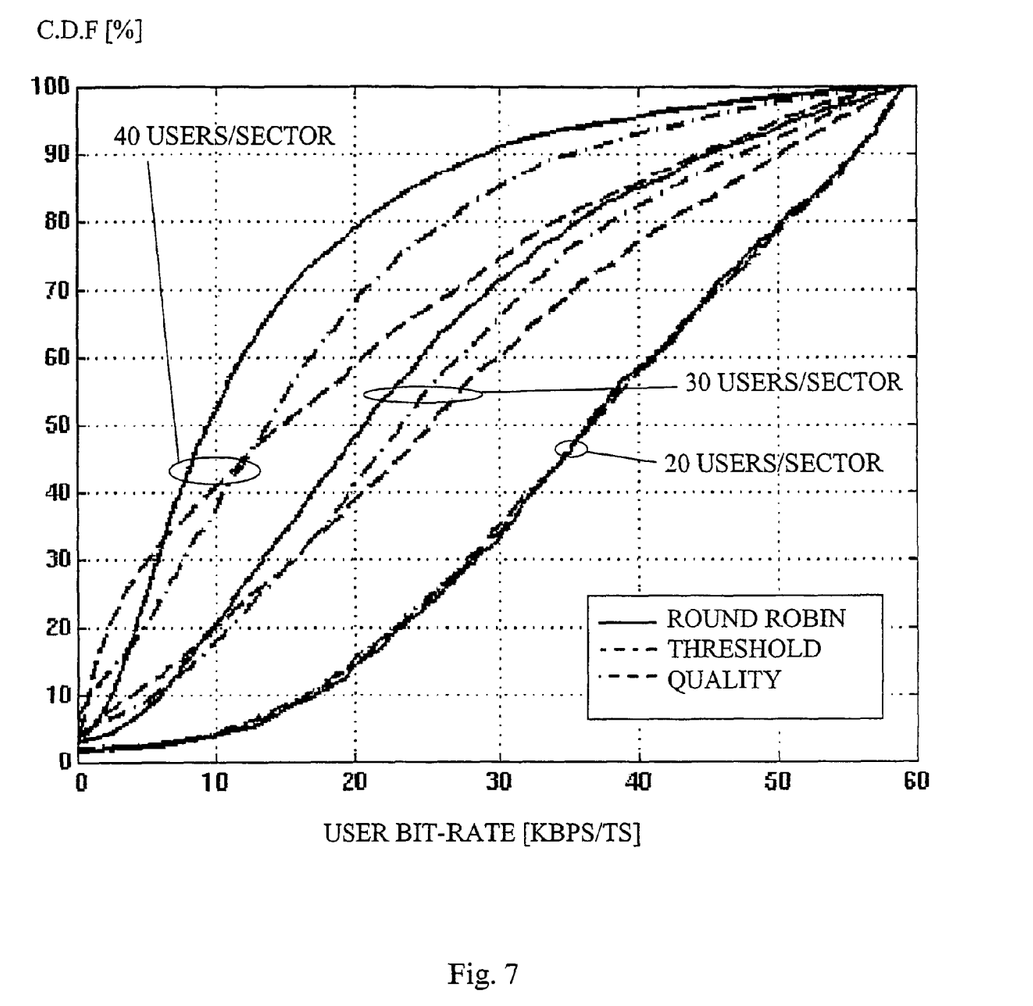
FIG. 7 is a diagram comparing radio quality based transmission scheduling with prior art transmission scheduling.

FIG. 7 illustrates a diagram that compares a prior art scheduling scheme with radio quality based transmission scheduling according to the technology disclosed herein.

The prior art Round Robin (RR) scheduling algorithm distributes the channel resources and transmissions equally among all mobile units. It is a simple algorithm and does not consider radio quality experienced user bit-rate or other quality measures. In the diagram RR is regarded as a prior art reference case since radio quality is not at all considered.

The threshold based scheduling uses a C/I cut-off threshold to decide whether a mobile unit is to be scheduled or not. Mobile units with better radio quality than the cut-off threshold are scheduled in a RR scheme, without any internal priority. This scheme means that mobile units with radio quality below the cut-off threshold may be scheduled but with lowest (absolute) priority. Further, all users are guaranteed at least every $20^{th}$ timeslot in order to collect quality measurements.

In the quality scheduling algorithm mobile units with best radio quality get channel resources and transmissions first. In this way, system capacity (throughput) and spectral efficiency is maximized on behalf of less user equality in terms of guaranteed delay or bit-rate. However, in this implementation each mobile unit is guaranteed a minimum transmission of at least every 20$^{th}$ timeslot, just as in the threshold case.

The diagram illustrates the distribution (cumulative distribution function, C.D.F) of user bit-rates at varying load situations (20, 30 and 40 users per sector or cell, respectively). The three compared schemes give similar bit-rate distributions at the lowest load, since there are relatively few scheduled occasions. However, when increasing the load the threshold and quality schemes improve the bit-rate for most of the users compared to the simple RR scheme, though at the expense of the (few) mobile units with worst quality.

In this diagram of FIG. 7, only single-slot mobile units have been used. The beneficial effects of employing a quality based scheduling (the threshold scheme and above all the quality scheme) will be even larger when applied to multi-slot capable mobile units. As a consequence, the dynamic radio quality based resource allocation of the technology disclosed herein is preferably combined with a dynamic radio quality based transmission scheduling to obtain an improved quality based resource management.

The resource management and resource allocation according to the technology disclosed herein can generally be applied to any channel resource that are used in radio communications system for allowing mobile units to communicate with base stations. However, in a presently particular preferred embodiment of the technology disclosed herein, the channel resources are timeslots. Thus, in such systems timeslots are dynamically allocated, based on radio quality representations, to multi-slot capable mobile units.

The technology disclosed herein is applicable both to single carrier systems and multi-carrier systems. In the former case, timeslots on a given carrier frequency are allocated to multi-slot mobile units based on radio quality. However, for the multi-carrier case, timeslots on different carriers can be allocated to the mobile units. For example, $Y_1$ timeslots on a first carrier frequency and $Y_2$ timeslots on a second different carrier frequency could be allocated to a X-slot mobile unit capable of managing such split carrier frequency, where $Y_1 + Y_2 \leq X$.

Although timeslots could be viewed as a presently preferred example of channel resources, the technology disclosed herein is not limited thereto. Actually any form of channel or communications resource, including bandwidth resources, for which multiple such resources can be allocated to a mobile unit could be used according to the technology disclosed herein. An example of such channel resource is spreading codes used in different CDMA-based communications systems. In such a system, a dynamic channel width, thus, consists of varying (spreading) codes. For example in high-speed downlink packet access (HSDPA) applications, the HSDPA code tree can be split up into two "medium" codes or up to four different "narrow" codes. This code splitting, often denoted code multiplexing, could thus allow transmission to up to four different mobile units during the same 2 ms long transmission burst. Thus, multiple such (narrow or medium) spreading codes can be allocated to a single multi-code capable mobile unit based on experienced radio quality according to the technology disclosed herein. In addition, the better the experienced quality the more of these spreading codes are allocated to the mobile unit and vice versa.

Figure 9:
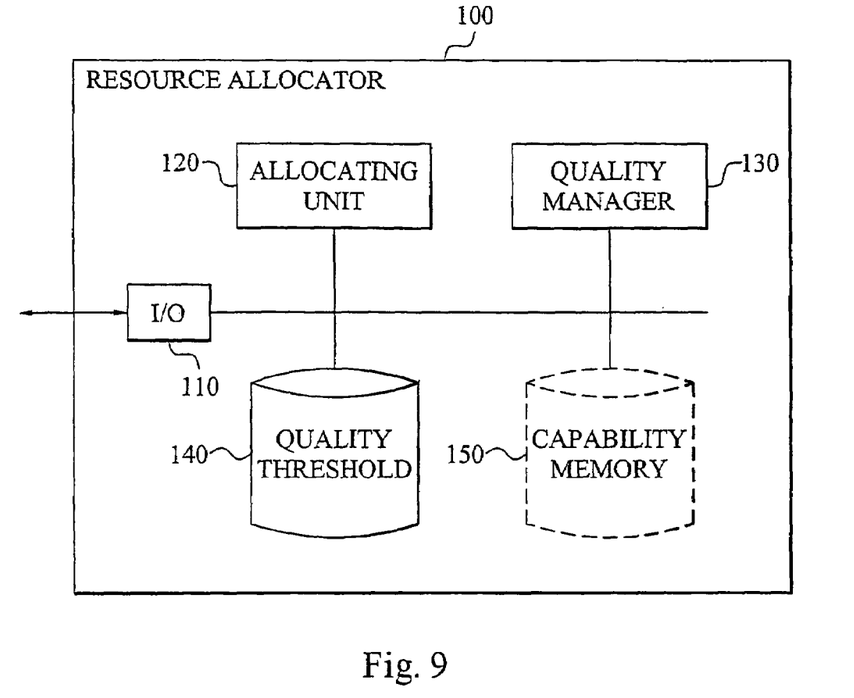
FIG. 9 is a schematic block diagram illustrating an example embodiment of a resource allocator according to the technology disclosed herein.

FIG. 9 is a schematic block diagram of a resource allocator 100 according to the technology disclosed herein for allocating multiple channel resources, preferably timeslots, to a multi-resource (multi-slot) capable mobile unit based on a radio quality representation. The allocator 100 generally includes an input and output (I/O) unit 110 for conducting communication with external units, including base stations and possibly also mobile units. This I/O unit 110, is in particular configured or adapted for receiving radio quality reports originating from base stations and/or mobile units. Furthermore, the I/O unit 110 is used by the allocator 100 for transmitting allocation commands or instructions to the base stations (possibly also mobile units).

The resource allocator 100 further includes an allocating unit 120 that performs the actual channel resource allocation for mobile units based on the received quality reports from the I/O unit 110. As has been mentioned in the foregoing, this allocating unit 120 is configured for allocating, based on the quality data, at most the number of resources equal to the predefined multiple resource capability number of the mobile unit, in some applications preferably less than the predefined capability number. Information of the respective capability number of the mobile units can be received from the mobile units themselves, possibly via the base station, via the I/O unit 110. Alternatively, the allocator 100 could obtain them from the network operator. In either case, the capability number can be stored in a memory or databank 150 in the allocator 100 or (externally) provided elsewhere but the allocator 100 then has access thereto. In such a case, the capability number is preferably stored together with an identification of the mobile unit, e.g. a mobile subscriber integrated service digital network (ISDN) number (MSISDN), international mobile subscriber identify (IMSI) or some other mobile unit associated identifier. However, in most cases the capability number is defined by the hardware and/or software equipment of the mobile unit and is therefore given by the particular mobile unit or terminal type. In those cases, the memory 150 could then instead store the capability number associated with different terminal types. When the allocator 100 is about to allocate channel resources to a mobile unit, the mobile unit, base station or some other network node or unit notifies the allocator 100 of the terminal type of the given mobile unit. The relevant capability number is then fetched from the memory 150 based on the mobile unit (user) identifier or terminal type identifier.

A (optional) quality manager 130 is preferably provided in the resource allocator 100 for defining sets of different number of channel resources. In addition, the manager 130 associates a respective radio quality threshold to the defined sets. These thresholds could be stored in a provided threshold memory 140 in the allocator 100 or otherwise associated thereto. It is even possible to store the thresholds and the capability number in a single memory. The quality manager 130 could be configured for setting fixed threshold values. Alternatively, the manager 130 (continuously or periodically) updates the threshold values based on received traffic conditions and system information from external units and network nodes in the communications system.

The quality manager 130 compares the received radio quality representation originating from the mobile unit and/or base station with the threshold values stored in the memory 140. A set of channel resources is then selected from that comparison. The allocating unit 120 is then informed of the number of resources of the selected set and allocates this number of channel resources to the mobile unit (unless the number is larger than the capability number of the mobile unit).

If the received quality data from the mobile unit and/or base station only contains raw data based directly on which the allocating unit 120 cannot make an allocation decision, the quality manager 130 could be configured for calculating or estimating the correct quality parameter(s) based on this raw data.

The units 110 to 130 of the resource allocator 100 may be provided as software, hardware or a combination thereof. The units 110 to 150 may be implemented together in the resource allocator 100. Alternatively, a distributed implementation is also possible with some of the units provided in different network nodes. The resource allocator 100 can generally be implemented in any radio access network or core network node in a radio communications system. Suitable locations are selected from, but not limited to, at least one of a BSS node, RNC node, BSC node, PCU node, base station.

Figure 10:
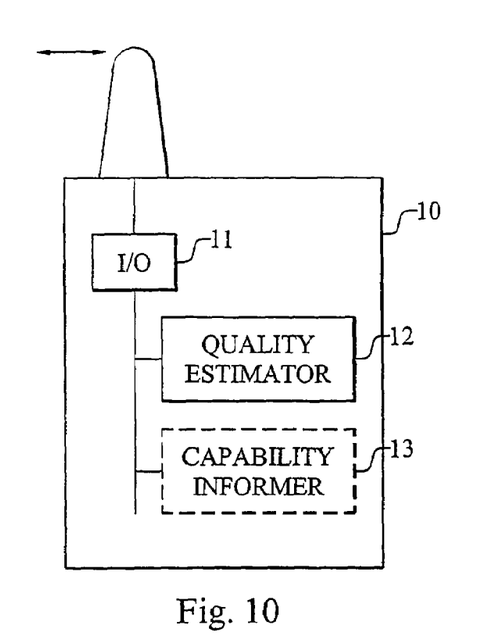
FIG. 10 is a schematic block diagram of an example embodiment of a mobile unit according to the technology disclosed herein.

FIG. 10 is a schematic block diagram of a mobile unit 10 according to the technology disclosed herein. Only units directly involved in operation according to the technology disclosed herein are illustrated in the figure. The mobile unit 10 generally includes an I/O unit 11 for conducting communication with external units, in particular with connected base stations. This I/O unit 11 is in particular configured for transmitting communications data using channel resources allocated to the mobile unit 10 based on a reported radio quality.

A quality estimator or measurer 12 is implemented in the mobile unit 10 for performing radio quality based measurements on a radio link between the mobile unit 10 and a base station. The estimator 12 further preferably generates a quality representation or parameter, e.g. one of the previously discussed parameters, based on these measurements. The measurer and estimator 12 could be configured for continuously, periodically or intermittently performing the quality measurements. Alternatively, such a measurement could be performed upon reception, by the I/O unit 11, of a measurement command e.g. from the base station. The generated quality estimation or measured raw data is then communicated using the I/O unit 11 to the resource allocator, possibly via the base station. This quality reporting could be conducted periodically, intermittently or upon reception of a report command.

A capability informer 13 is optionally implemented in the mobile unit 10 for informing the resource allocator of the maximum resource capability number, i.e. the maximum number of channel resources that can be allocated to and used by the mobile unit 10. In an alternative embodiment, the informer 13 sends an identification of the mobile unit 10 or the user of the mobile unit 10, or a terminal type identifier to the allocator. This information is then used by the allocator for determining the capability number of the mobile unit 10.

The units 11 to 13 of the mobile unit 10 may be provided as software, hardware or a combination thereof.

Figure 11:
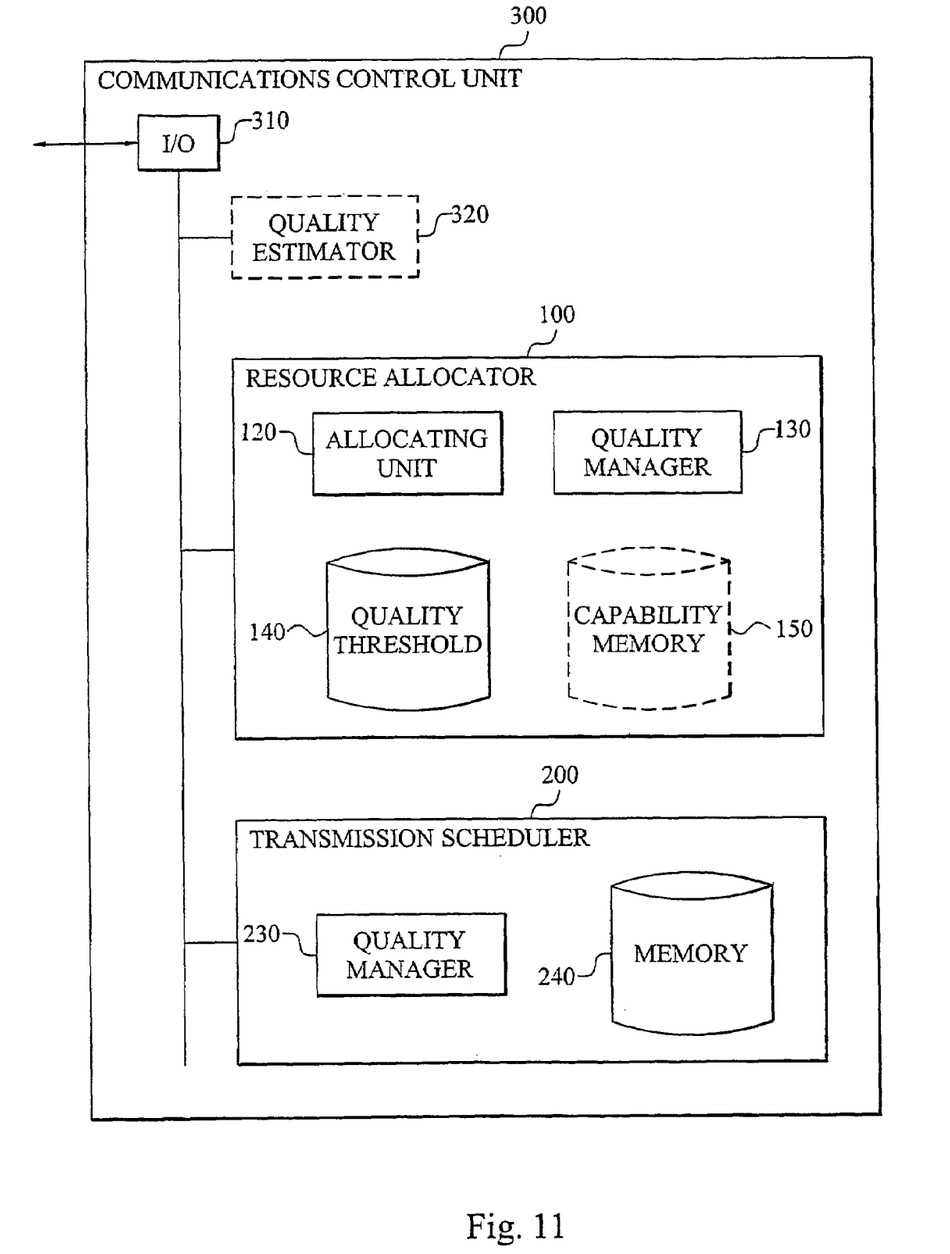
FIG. 11 is a schematic block diagram of an example embodiment of a communications control unit according to the technology disclosed herein.

FIG. 11 is a schematic block diagram of a communications control unit 300 according to the technology disclosed herein. This control unit 300 is provided in a communications system for performing resource management on behalf of a network or service provider, in particular for managing resource allocation and transmission scheduling.

The control unit 300 generally includes an I/O unit 310 for conducting communication with external units, including base stations and possibly also mobile units. This I/O unit 310 is in particular configured or adapted for receiving radio quality reports from base stations and/or mobile units. Furthermore, the I/O unit 310 is used by the control unit 300 for transmitting allocation and scheduling commands or instructions to the base stations (possibly also to mobile units).

The control unit further includes a resource allocator 100. This allocator 100 basically corresponds to the allocator described above in connection with FIG. 9 and is not further discussed.

A transmission scheduler 200 is implemented in the control unit 300 for scheduling transmission based on received quality parameters on the channel resources allocated by the resource allocator 100. These quality parameters preferably originate from mobile units and/or base stations and are received by the I/O unit 310. The scheduler 200 is in a first embodiment implemented to schedule transmission based only on radio quality representations. In an alternative realization, a combination of radio quality and priority based scheduling could be used. In such a case, the priority will be determined at least partly of the provided radio quality representations and preferably also on QoS requirements, such as traffic class, traffic handling priority data and allocation/retention priority, of the different communications services.

In a preferred implementation, the scheduler 200 is configured for guaranteeing at least a minimum amount of transmissions to each mobile unit in the system in a given period of time. This minimum transmission limit can be set by a quality manager 230 in the scheduler 300. This manager 230 could use fixed threshold values, such as guarantee at least transmission at every $z^{th}$ channel resource for the mobile units, where z is an integer larger than one. Alternatively, the manager 230 could update or adjust this transmission limit during operation to adapt for changing system or traffic conditions, e.g. the user density in the sectors, the portion of the users that use multi-resource capable mobile units, etc. In either case, the determined limit value is preferably associated with a radio quality threshold. Thus, a mobile unit experiencing a worse quality than represented by this quality threshold will be scheduled the minimum number of transmissions according to the transmission limit. Transmission for remaining mobile units are then scheduled based, at least partly, on their respective experienced quality.

The transmission limit and its associated quality threshold are preferably stored in a memory 240 in the scheduler 200 or otherwise associated thereto.

The control unit 300 can optionally include a quality estimator 320. If this control unit 300 is implemented in connection with a base station, the estimator 320 could be configured for measuring and estimating qualities for the radio links between the base station and different mobile units. In additions, if the control unit 300 only receives measurement raw data from the base station and/or mobile unit, this estimator 320 could calculate the relevant quality parameter(s) that will be used by the resource allocator 100 and the transmission scheduler 200.

The units 100, 120, 130, 200, 230, 310 and 320 of the control unit 300 may be provided as software, hardware or a combination thereof. The units 100-150, 200-240, 310 and 320 may be implemented together in the control unit 300. Alternatively, a distributed implementation is also possible with some of the units provided in different network nodes. For example, the resource allocator 100 could be implemented in a first network node and the transmission scheduler 200 could then be implemented in a second different network node. The control unit 300 can generally be implemented in any radio access network or core network node in a radio communications system. Suitable locations are selected from, but not limited to, at least one of a BSS node, RNC node, BSC node, PCU node, base station.

It will be understood by a person skilled in the art that various modifications and changes may be made to the present invention without departure from the scope thereof, which is defined by the appended claims.

The invention claimed is:

1. A method of managing timeslots in a radio communications system, said method comprising the acts of:

estimating a radio quality for a radio link between a base station and a multi-slot mobile unit with a predefined multiple slot capability number; and dynamically allocating, based on said estimated radio quality, a number of timeslots to said mobile unit for usage on said radio link by:

defining sets of different number of said timeslots associated with said base station, each set comprises equal to or less than said predefined capability number of timeslots;

associating each set with a different respective quality threshold;

selecting a set based on a comparison between said estimated radio quality and said different respective quality thresholds, wherein said allocating act comprises dynamically allocating the number of timeslots of said selected set to said mobile unit including allocating $Y_1$ timeslots to said mobile unit at a first estimated radio quality and dynamically allocating $Y_2$ timeslots to said mobile unit at a second comparatively lower estimated radio quality, where $Y_1 > Y_2$ and $Y_1, Y_2$ are integers equal to or smaller than said predefined capability number; and dynamically adjusting set definitions during operation.

2. The method according to claim 1, wherein said allocating act comprises dynamically allocating, based on said estimated radio quality, multiple timeslots to said mobile unit for usage on said radio link.

3. The method according to claim 1, wherein said allocating act comprises dynamically allocating, based on said estimated radio quality, less than said predefined capability number of timeslots to said mobile unit for usage on said radio link.

4. The method according to claim 1, further comprising adaptively adjusting said different respective quality thresholds.

5. The method according to claim 1, further comprising scheduling transmission for said mobile unit on said radio link using said allocated timeslots based on said estimated radio quality.

6. The method according to claim 5, wherein said scheduling act comprises scheduling at least a minimum number of transmissions per time unit for said mobile unit.

7. The method according to claim 6, wherein said minimum number of transmissions per time unit is determined based on a transmission priority associated with said mobile unit.

8. The method according to claim 6, wherein said base station conducts data communication with multiple mobile units and said minimum number of transmissions per time unit is determined based on the number of mobile units communicating with said base station.

9. The method according to claim 5, wherein said base station conducts data communication with at least two mobile units and said scheduling act comprises scheduling a first mobile unit to transmit data before or more often than a second mobile unit, where a radio quality of a radio link associated with said first mobile unit being comparatively higher than a corresponding radio quality of a radio link associated with said second mobile unit.

10. A resource allocator for allocating timeslots to a multi-slot mobile unit with a predefined multiple slot capability number, said allocator comprising:

means for providing a radio quality estimation for a radio link between said mobile unit and a base station; and means for dynamically allocating, based on said radio quality estimation from said providing means, a number of timeslots to said mobile unit for usage on said radio link, the allocating means comprising:

means for defining sets of different number of said timeslots, where each set is associated with a different respective quality threshold and comprises equal to or less than said predefined capability number of timeslots;

means for selecting a set based on a comparison between said radio quality estimation and said different respective quality thresholds, wherein said allocating means is configured for dynamically allocating the number of bandwidth resources of said selected set to said mobile unit including allocating $Y_1$ timeslots to said mobile unit for a first estimated radio quality and dynamically allocating $Y_2$ timeslots to said mobile unit for a second comparatively lower estimated radio quality, where $Y_1 > Y_2$ and $Y_1, Y_2$ are integers equal to or smaller than said predefined capability number; and means for dynamically adjusting set definitions during operation.

11. The allocator according to claim 10, wherein said allocating means is configured for dynamically allocating, based on said radio quality estimation from said providing means, less than said predefined capability number of timeslots to said mobile unit for usage on said radio link.

12. The allocator according to claim 10, further comprising means for adaptively adjusting said different respective quality thresholds.

13. A communications control unit adapted for controlling data communication between a multislot mobile unit, with a predefined multiple slot capability number, and a base station on a radio link, said control unit comprising:

means for providing a radio quality estimation for said radio link; and a resource allocator for dynamically allocating, based on said radio quality estimation from said providing means, a number of timeslots to said mobile unit for usage on said radio link, the resource allocator comprising:

means for defining sets of different number of said timeslots, where each set is associated with a different respective quality threshold and comprises equal to or less than said predefined capability number of timeslots;

means for selecting a set based on a comparison between said radio quality estimation and said different respective quality thresholds, wherein said allocator is configured for dynamically allocating the number of timeslots of said selected set to said mobile unit including dynamically allocating $Y_1$ timeslots to said mobile unit for a first estimated radio quality and dynamically allocating $Y_2$ timeslots to said mobile unit for a second comparatively lower estimated radio quality, where $Y_1 > Y_2$ and $Y_1, Y_2$ are integers equal to or smaller than said predefined capability number; and means for dynamically adjusting set definitions during operation.

14. The control unit according to claim 13, wherein said allocator is configured for dynamically allocating, based on said radio quality estimation from said providing means, less than said predefined capability number of timeslots to said mobile unit for usage on said radio link.

15. The control unit according to claim 13, further comprising means for adaptively adjusting said different respective quality thresholds.

16. The control unit according to claim 13, further comprising a transmission scheduler for scheduling transmission for said mobile unit on said radio link using said allocated timeslots based on said radio quality estimation from said providing means.

17. The control unit according to claim 16, wherein scheduler is configured for scheduling at least a minimum number of transmissions per time unit for said mobile unit.

18. The control unit according to claim 17, wherein said minimum number of transmissions per time unit is determined based on a transmission priority associated with said mobile unit.

19. The control unit according to claim 17, wherein said base station conducts data communication with multiple mobile units and said minimum number of transmissions per time unit is determined based on the number of mobile units communicating with said base station.

20. The control unit according to claim 16, wherein said base station conducts data communication with at least two mobile units and said scheduler is configured for scheduling a first mobile unit to transmit data before or more often than a second mobile unit, where a radio quality of a radio link associated with said first mobile unit being comparatively higher than a corresponding radio quality of a radio link associated with said second mobile unit.

* * * * *

UNITED STATES PATENT AND TRADEMARK OFFICE
CERTIFICATE OF CORRECTION

PATENT NO. : 8,107,425 B2  Page 1 of 1
APPLICATION NO. : 11/662386
DATED : January 31, 2012
INVENTOR(S) : de Bruin et al.

Figure 8:
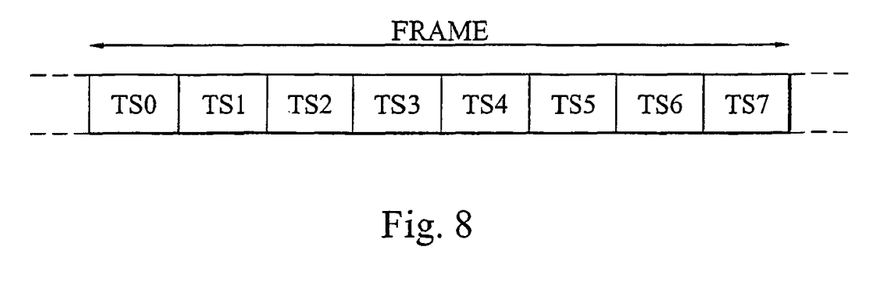
FIG. 8 schematically illustrates organization of timeslots into frames.

It is certified that error appears in the above-identified patent and that said Letters Patent is hereby corrected as shown below:

In Column 11, Line 32, below "units.", insert -- FIG. 8 schematically illustrates the organization of such timeslots (TS0-TS7) into frames with a defined number of timeslots (TS0-TS7), e.g. 8 slots, per frame. These timeslots (TS0-TS7) are the channel resources used by the mobile units for transmitting data. The number of timeslots (TS0-TS7) that the base station has access to and can allocate to connected users may differ from different communications systems and also over time in a given system. --, as a new paragraph.

Signed and Sealed this
Nineteenth Day of June, 2012

David J. Kappos
*Director of the United States Patent and Trademark Office*